Oct. 23, 1923.
F. B. CONVERSE
1,471,829
TIRE TREAD AND METHOD OF APPLYING THE SAME
Filed Sept. 17, 1920     2 Sheets-Sheet 2
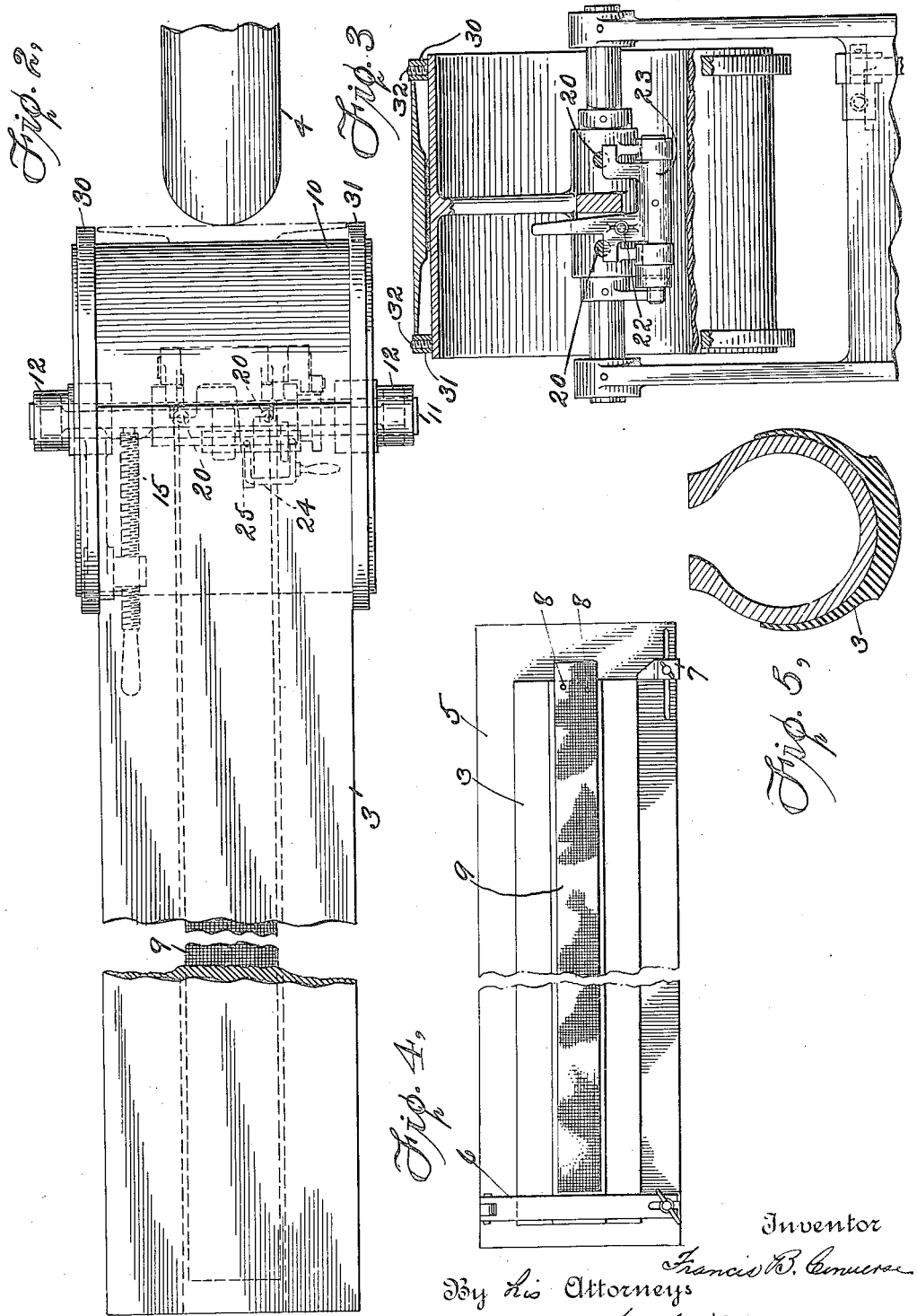
Inventor
Francis B. Converse
By his Attorneys
Kiddle & Margeson Patented Oct. 23, 1923.

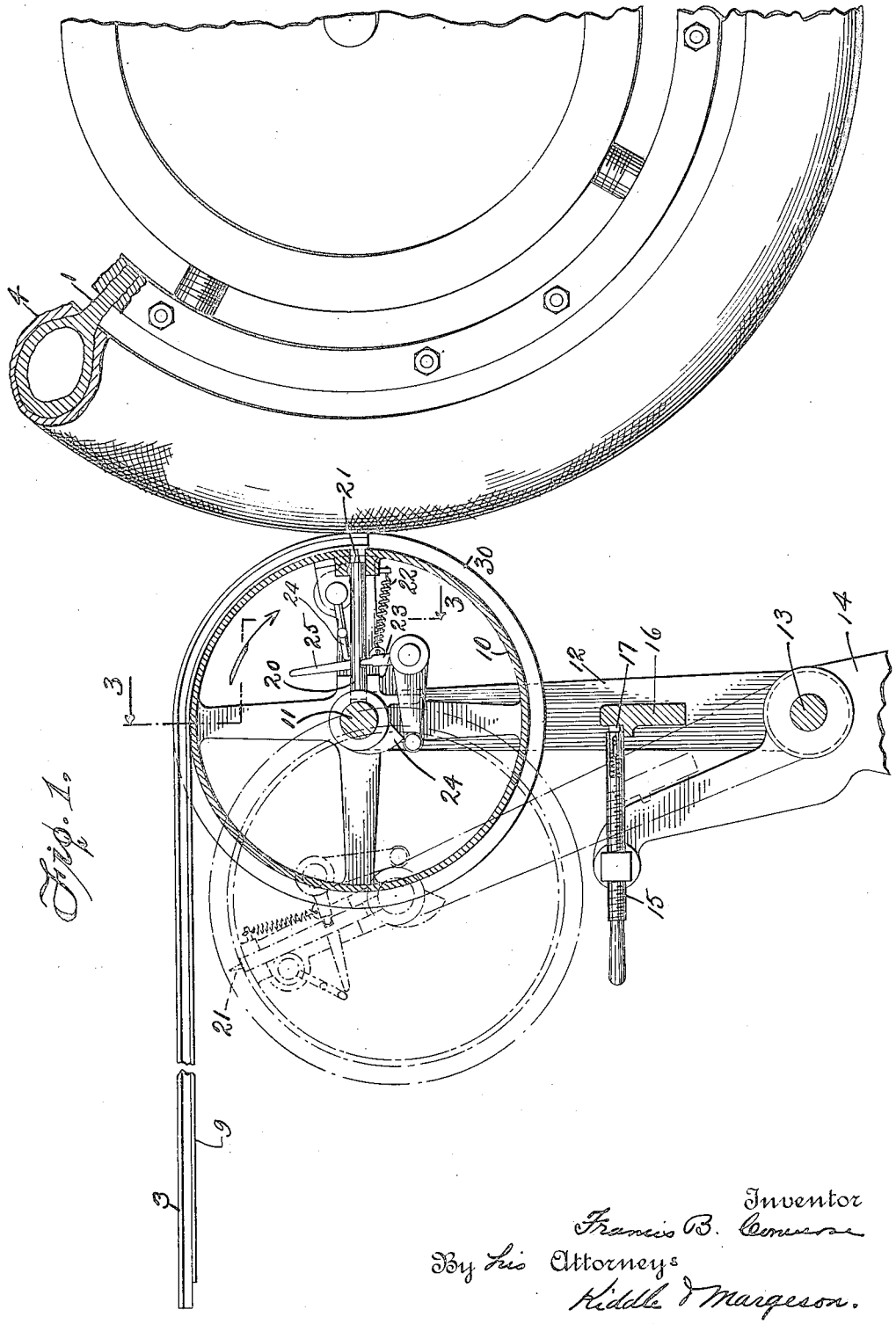

1,471,829

UNITED STATES PATENT OFFICE.

FRANCIS B. CONVERSE, OF NORWALK, CONNECTICUT, ASSIGNOR TO THE NORWALK TIRE AND RUBBER COMPANY, OF NORWALK, CONNECTICUT, A CORPORATION OF CONNECTICUT.

TIRE TREAD AND METHOD OF APPLYING THE SAME.

Application filed September 17, 1920. Serial No. 410,887.

*To all whom it may concern:*

Be it known that I, FRANCIS B. CONVERSE, a citizen of the United States, and a resident of Norwalk, county of Fairfield, and State of Connecticut, have invented certain new and useful Improvements in Tire Treads and Methods of Applying the Same, of which the following is a specification.

This invention relates to an attachment for tire machines to aid in applying the rubber treads to the fabric carcass of pneumatic tires. This operation is commonly done by hand.

The tread of a pneumatic tire consists of a rubber slab of the required cross-section and approximately the length of the periphery of the tire. The slab is from seven to ten feet long for the ordinary sizes of tires. On account of the difficulty of making the tread slab exactly to gage, it is made, for use with this appliance, within designated limits so that a length of the tread that is of exactly the required weight is never of greater length than the tire periphery and generally less than that periphery by an amount not in excess of the assigned limit. This requirement for a tread of a certain weight for a tire 104 inches in periphery, may be, for example, that the tread shall not exceed 104 inches nor be less than 98 inches.

Ordinarily such a tread is applied by hand by sticking one end of the tread to the carcass and then wrapping the whole of the tread around the tire; the amount of the shortage being observed, the tread is partially removed from the carcass in order to stretch it sufficiently to make it the required length, then re-applied; and when it is brought to the exact length it is centered on the carcass by gauging its position with calipers at a number of points around the tire, and removing the tread sufficiently to relocate it accordingly.

The present invention has for its purpose to provide means whereby the tread as it is applied to the carcass is brought to the exact required length and is located centrally with respect to the center line of the tire in a single operation without the necessity of removing the tread to stretch it to length and to locate it sideways.

In the drawing Fig. 1 is a front elevation of the mechanism;

Fig. 2 is a plan;

Fig. 3 is an elevation partially in section on line 3—3 of Fig. 1;

Fig. 4 is a plan view (on a reduced scale) of a table used in connection with the mechanism; and Fig. 5 is a cross-section of a tire carcass with the tread in place.

For use with the present appliance, the tread slab 3 after being cut to a length that gives the required weight, is laid flat on the worker's table 5, as shown in Fig. 4, one end clamped in a fixed clamp, 6, and stretched to the exact required length. A gage 7, located at the required distance from the clamp indicates the length; and the tread slab is held in this stretched condition by pressing it down on pins 8 that project from the surface of the table, while a strip of frictioned non-extensible fabric 9 is applied to the outside face of the slab. The raw rubber on this strip of fabric adheres to the raw rubber of the tread. This fabric may be a cotton fabric of ordinary weave, except that preferably a portion of its warp threads are composed of very slightly twisted strands of some long fibre as for instance ramie fibre; or they may be fine steel wires; or it may consist of an ordinary fabric rubberized and vulcanized while held under longitudinal tension; the requirement being that the fabric strip shall be relatively non-extensible.

When the tread is released from the clamp it tends to contract to its original length and the attached adhering strip shows a slightly wrinkled appearance throughout its length due to this contraction.

One end of this tread is now applied to a carcass 4 on a core 1 in the tire machine or on a tire maker's stand and the core revolved. The operator holds back on the tread sufficiently to overcome the elasticity of the tread as it is wrapped about the core thereby stretching it to the length permitted by the attached non-extensible strip on the outside face thereof, which is the required length for the tire. When the tread has been thus applied the strip is peeled off from the tread and may be thus used a number of times before it will be necessary to re-cement or friction it.

To aid the operator in thus applying the tread the present appliance is provided. The function of this appliance is primarily to furnish a proper guide for the tread in order that it may be run on to the carcass centrally. It consists of a drum 10 somewhat wider than the tread with which it is to be used, mounted to revolve freely, on a shaft 11 which is carried in the upper end of a frame 12. The lower end of this frame is pivoted at 13 to a base 14 resting on the floor. The inoperative position of this drum is shown in broken lines in Fig. 1.

When a tread is to be applied the drum is swung over against the tire carcass; the end of a rod 15 pivoted to the base casting 14, engages a cross member 16 of the pivoted frame and holds it in this position. The rod being threaded in its support, may be screwed in or out for smaller or larger tires. The engaging end of this rod is provided with a spring pressed plunger 17, that holds the drum yieldingly against the carcass. The end of the rod definitely limits the movement of the drum away from the carcass to an amount only slightly greater than the thickness of the tread.

Two rods 20 having sharp pins 21 projecting from their outer ends are radially mounted in the drum. A spring 22 connected with the pivoted arm 23 causes these pins to be projected above the face of the drum, as shown in the broken lines of Fig. 1. The drum being located with the pins standing vertically and projecting, the end of the tread is laid on the drum and pressed onto these pins. The drum is then turned until the end of the tread is brought in contact with the carcass. The tire machine is then operated to turn the carcass, thereby turning the drum, resulting in the pins being retracted by a cam 24 secured to the drum shaft. A pivoted rod 24 drops in ahead of the extended end 25 of the pivoted arm, to the position shown, to lock the pins in the retracted position.

As the tread is thus run onto the carcass the operator guides it centrally between the guide rings 30 and 31, adjustably located (by set screws 32) on the drum to the tread width; at the same time he manually tensions the tread sufficiently to stretch it to the limit of the non-extensible strip. It is desirable that the last few inches of the tread be not stuck to the carcass by this applying action, in order to permit the operator to properly abut the ends and make the "splice". He therefore releases the end of the tread as it passes onto the drum, and also releases the pivoted frame to let it swing away from the tire, by pressing down on the outer end of the pivoted rod, 15.

The non-extensible strip is then peeled from the tread, the splice is formed and the tread is rolled down onto the carcass in the usual manner. The tread is thus applied in a single direct operation much more quickly than can be done by the usual hand method; it is, when thus applied, of the required length so that the ends can be at once abutted and "spliced"; and it is located on the tire more accurately with reference to the center line of the tire than can ordinarily be done by hand.

What I claim is:

1. The method of applying a tread strip to a tire carcass which method consists in stretching a tread to the required length, applying a non-extensible strip to the tread while so stretched, then applying the tread to the carcass and while so applying the tread tensioning the tread to stretch it to the limit of the non-extensible strip.

2. The method of applying a tread strip to a tire carcass which method consists in stretching a tread to its required length, securing a non-extensible strip to the tread while so stretched, thereafter applying the same to the carcass, and tensioning it to stretch it to the limit of the non-extensible strip while so applying, and thereafter removing the non-extensible strip.

3. In combination, a tire tread slab and a non-extensible strip applied to the outside face thereof to limit the length of the slab.

4. In combination, a tire tread slab of the required length and a non-extensible strip removably secured to the outside face thereof.

This specification signed this 11th day of Sept., 1920.

FRANCIS B. CONVERSE.